(12) United States Patent
Anderton

(10) Patent No.: US 6,565,161 B2
(45) Date of Patent: May 20, 2003

(54) HEAVY DUTY TRACK LINK

(75) Inventor: Peter W. Anderton, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/896,462

(22) Filed: Jun. 29, 2001

(65) Prior Publication Data

US 2003/0001433 A1 Jan. 2, 2003

(51) Int. Cl.⁷ .............................................. B62D 55/21
(52) U.S. Cl. ..................... 305/103; 305/106; 305/202
(58) Field of Search .................................. 305/103, 104, 305/105, 106, 202; 59/84, 7, 30; 29/434

(56) References Cited

U.S. PATENT DOCUMENTS

| | | |
|---|---|---|
| 3,357,750 A | 12/1967 | Reynolds et al. |
| 3,823,989 A | 7/1974 | Boggs et al. |
| 3,841,716 A | 10/1974 | Webber et al. |
| 3,913,986 A | 10/1975 | Schaffner |
| 3,947,074 A | 3/1976 | Nelson |
| 3,958,836 A | 5/1976 | Brown et al. |
| 4,059,314 A | 11/1977 | Amstutz |
| 4,159,857 A | 7/1979 | Purcell |
| 4,204,716 A * | 5/1980 | Baylor |
| 4,241,956 A | 12/1980 | Meisel |
| 4,257,653 A | 3/1981 | Meisel, Jr. et al. |
| 4,274,682 A | 6/1981 | Livesay |
| 4,469,336 A * | 9/1984 | Linne |
| 4,819,999 A * | 4/1989 | Livesay et al. |
| 5,172,965 A * | 12/1992 | Taft |
| 5,183,318 A * | 2/1993 | Taft et al. |
| 5,257,858 A * | 11/1993 | Taft |
| 5,390,997 A * | 2/1995 | Nakaishi et al. |
| 6,390,572 B1 * | 5/2002 | Idetsu et al. ................. 305/103 |
| 2001/0003895 A1 | 6/2001 | Bedford et al. |

OTHER PUBLICATIONS

See 1 in Addendum.

* cited by examiner

Primary Examiner—Russell D. Stormer

(57) ABSTRACT

A track link assembly having a first pair of track links, and a second pair of track links is disclosed. The track link assembly further includes a bushing having ends pressed into an inner boss of the second pair of track links. The track link assembly yet further includes a solid track pin positioned within the bushing and swaged to the outer boss of the first track links. The track link further includes a thrust ring interposed between the end of the bushing and the outer boss of the respective one of the first pair of track links. The track link assembly still further includes a seal assembly positioned adjacent each thrust ring.

5 Claims, 1 Drawing Sheet ured in contaminated environments, the track link assembly 10 further includes a bushing (not shown) that is nonrotatably pressed into the inner boss of the second left track link 30 and the second right track link 50.

HEAVY DUTY TRACK LINK

TECHNICAL FIELD OF THE INVENTION

The present invention generally relates to a track link used in an endless track, and more specifically to heavy duty track link.

BACKGROUND OF THE INVENTION

Endless track assemblies for crawler-type construction equipment include a plurality of spaced co-acting track links with laterally overlapping ends joined by track bushings and track pins. The main cause of damage to the track assembly is wear and fatigue. Wear results from the harsh, contaminated environments in which the track assembly operates. In some cases, extreme wear in the form of galling or metal transfer occurs between the pin and bushing. To overcome this problem, lubricated tracks have been used in which a lubricant is positioned between the pin and the bushing.

In order to advance lubricant to the interface between the pin and the bushing in a lubricated track, the pin is typically hollowed out, such that lubricant can be advanced from the center of the pin the to interface between the pin and the bushing. In some applications, such as operating a tracked machine in the forest, the strength of the track link is extremely important. A disadvantage to using a hollow track pin is that the strength the pin is significantly reduced for these type of applications.

What is needed therefore is a heavy track link having a solid pin which retains a lubricant between the pin and the bushing which overcomes the above mentioned disadvantages.

DISCLOSURE OF THE INVENTION

In accordance with a first aspect of the present invention, there is provided a track link assembly having a first left link having an outer boss and an inner boss defined therein, a second left link having an outer boss and an inner boss defined therein a first right link having an outer boss and an inner boss defined therein, and second right link having an outer boss and an inner boss defined therein. The track link further includes a bushing having a left end pressed into the inner boss of the second left track link and a right end pressed into the inner boss of the second right track link. The track link yet further includes a solid track pin positioned within the bushing, swaged to the outer boss of the first left track link, and swaged to the outer boss of the first right track link a left thrust ring interposed between the left end of the bushing and the outer boss of the first left track link. The track link still further includes a right thrust ring interposed between the right end of the bushing and the outer boss of the first right track link and a left seal positioned adjacent the left thrust ring and interposed between the left end of the bushing and the outer boss of the first left track link. The track link yet further includes a right seal positioned adjacent the right thrust ring and interposed between the right end of the bushing and the outer boss of the first right track link.

In accordance with a second aspect of the present invention, there is provided a method of assembling a track link assembly. The method includes the steps of pressing a left end of a bushing into an inner boss of a second left track link and pressing a right end of a bushing into an inner boss of a second right track link. The method further includes the steps of positioning a left thrust ring and a left seal assembly into a cavity adjacent to an outer boss of a first left track link and positioning a right thrust ring and a right seal assembly into a cavity adjacent to an outer boss of a first right track link. The method yet further includes the steps of lubricating a track pin, inserting the track pin through the outer boss of the first right track link, center of the bushing, and the outer boss of the first left track link 20, swaging the left end of the pin to the outer boss of the first left track link, and swaging the right end of the pin to the outer boss of the first right track link.

BEST MODE CARRYING OUT THE INVENTION

Figure 1:
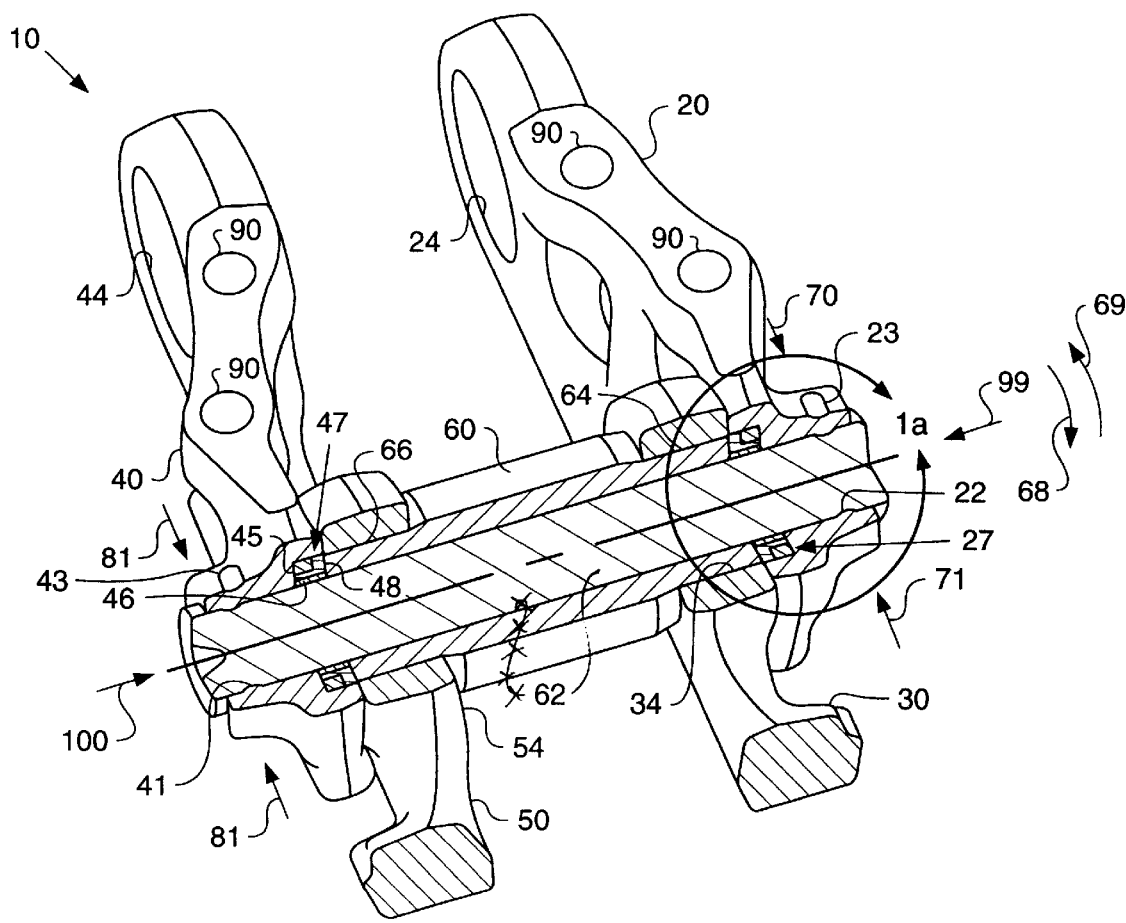
FIG. 1 is a partially cutaway view of a track link which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1 there is shown a track link assembly 10 that incorporates the features of the present invention therein. The track link assembly 10 includes a first left track link 20, a second left track link 30, a first right track link 40 and a second right track link 50. The first left track link 20 has an outer boss 22 and an inner boss 24 defined therein. The inner boss 22 is adapted to receive a bushing (not shown) whereas the outer boss 24 is adapted to receive a track pin 62. Similarly, the second left track link 30 has an outer boss (not shown) and an inner boss 34 defined therein. The inner boss 34 is adapted to receive a bushing 60.

The first right track link 40 has an outer boss 42 and an inner boss 44 defined therein. The inner boss 42 is adapted to receive a bushing (not shown) whereas the outer boss 44 is adapted to receive the track pin 62. Similarly, The second right track link 50 has an outer boss (not shown) and an inner boss 54 defined therein. The inner boss 54 is adapted to receive the bushing 60.

To secure the second left track link 30 to the second right track link 50, the bushing 60 is secured to the second left track link 30 and the second left track link 40. To secure the bushing 60 to the second right track link 50 a left end 64 of the bushing 60 is non-rotatably pressed into the inner boss 34 of the second left track link 30. Similarly, to secure the bushing 60 to the second right track link 50 a right end 66 of the bushing 60 is non-rotatably pressed into the inner boss 54 of the second right track link 60.

To form a rotatable joint between the corresponding first track links 20, 40 and the second track links 30, 50, a central portion of the track pin 62 is positioned within the bushing 60, a left portion of the track pin 62 is secured to the first left track link 20 and a right portion of the track pin 62 is secured to the first right track link 40. Thus, the second track links 30, 50 are free to rotate about the track pin 62 relative to the first track links 20, 40 in the general direction of arrows 68, 69. To reduce wear between the track pin 62 and the bushing 60 a grease is applied to the outer surface of the track pin 62. The grease is preferably a SPF 4 grease containing 5% Moly grease.

The track pin 62 is preferably secured to the first left track link 20 by swaging the first left track link 20 to the pin 62. To swage the first left track link 20 to the pin 62, a tool (not shown) is used to compress material from the first left track link 20 in a radial direction, indicated by arrows 70, 71, into a groove 61 defined in the left end of the first left track link 20. The result of the swaging process is a dimple 23 which is visible adjacent to the groove 61. Similarly, to swage the first right track link 40 to the pin 62, a tool (not shown) is used to compress material from the first right track link 40 in the radial direction, indicated by arrows 80, 81, into a groove 41 defined in the right end of the first right track link 40. The result of the swaging process is a dimple 43 which is visible adjacent to the groove 41.

It should be appreciated that as the swaging process forces material from the first left track link 20 and first right track link 40 into the grooves 21, 41 of the track pin 62, the track pin 62 is compressed axially in the general direction of arrows 99, 100. This axial compression will cause excess friction which will lock the first track links 20, 40 to the second track links 30, 50. To prevent the first track links 20, 40 from being permanently locked to the second track links 30, 50, the pin 62 is pre-compressed axially in the general direction of arrows 99, 100. After the swaging process is completed, this axial pre-compression is released, which unlocks the first track links 20, 40 from the second track links 30, 50.

Figure 1A:
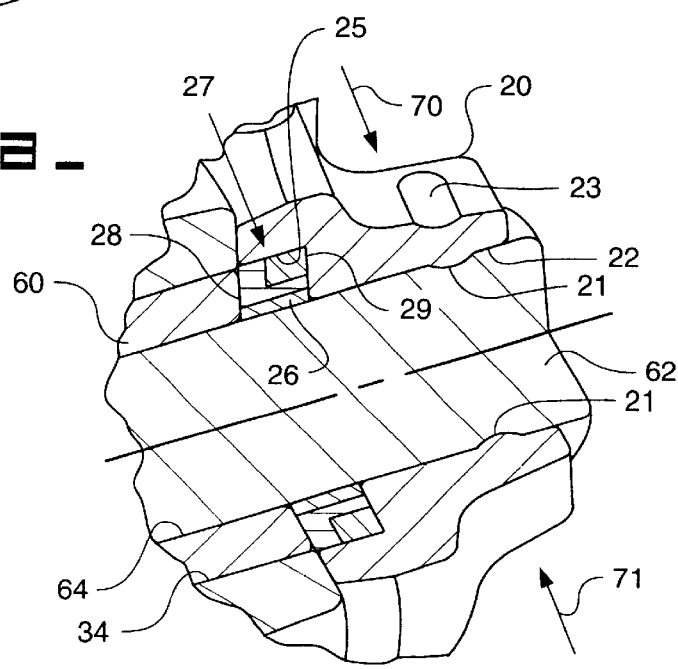
FIG. 1A is an exploded view of a portion of the track link of FIG. 1.

Referring now to FIG. 1A, a seal cavity 25 is defined in the first left track link 20 adjacent to the outer boss 22. A left thrust ring 26 is positioned within the seal cavity 25 and is interposed between the bushing 60 and the first left track link 20 such that movement of the bushing 60 toward the first left track link 20 is limited by the left thrust ring 26. A left seal assembly 27 is preferably composed of a shear seal 28 positioned within the seal cavity 25 adjacent to the left thrust ring 26. The left seal assembly 27 is composed of a shear seal 28 which acts prevents the grease between the track pin 62 and bushing 60 from escaping by the left end 64 of the bushing 60. The left seal assembly 27 further includes a load ring 29 which biases the shear seal 28 against the bushing 62. It should be appreciated that the left thrust ring 26 prevents compression of the left seal 27 during axial pre-compression and redial swaging of the track pin 62 to the first left track link 20.

Referring again to FIG. 1, a seal cavity 45 is defined in the first right track link 40 adjacent to the outer boss 42. A right thrust ring 46 is positioned within the seal cavity 45 and is interposed between the bushing 60 and the first right track link 40 such the movement of the bushing 60 toward the first right track link 40 is limited by the right thrust ring 46. A right seal assembly 47 is positioned within the seal cavity 45 adjacent to the right thrust ring 46. The right seal assembly 47 is composed of a shear seal 48 which acts prevents the grease between the track pin 62 and bushing 60 from escaping by the right end 66 of the bushing 60. The right seal 47 further includes a load ring 49 which biases the shear seal 48 against the bushing 62. It should be appreciated that the right thrust ring 46 prevents compression of the right seal 47 during pre-compression and swaging of the track pin 62 to the first right track link 40.

A number of left track links 20, 30 and right track links 40, 50 form an endless track for crawler-type construction equipment. To contact the ground, shoes (not shown) are attached to the links 20, 30, 40, 50 via the mounting holes 90.

Industrial Applicability

In operation, the track assembly 10 is assembled by non-rotatably pressing the left end 64 of the bushing 60 into the inner boss 34 of the second left track link 30 and non-rotatably pressing the right end 66 of the bushing into the inner boss 54 of the second right track link 50 to secure the second left track link 30 to the second right track link 50. The left thrust ring 26, shear seal 28, and load ring 29 are then inserted into the left seal cavity 25 of the first left track link 20. The right thrust ring 46, shear seal 48, and load ring 49 are then inserted into the right seal cavity 45 of the first right track link 40.

The track pin 62 then greased and inserted respectively through the outer boss 42 of the first right track link 40, center portion of the bushing 60, and the outer boss 22 of the first left track link 20. The solid track pin 62 is then pre-compressed in the general direction of arrows 99, 100. The first left track pin 20 is then swaged to the left end of the track pin 62 whereas the first right track pin 40 is swaged to the right end of the track pin 62. During the swaging process, the left thrust ring 26 prevents compression of the left seal assembly 27 whereas the right thrust ring 46 prevents compression of the right seal assembly 47. To unlock the track link assembly 10, the pre-compression is released from the track pin 62.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

I claim:

1. A track link assembly comprising: a first pair of track links, each of the first track links having an outer boss and an inner boss defined therein;

a second pair of track links, each of the second track links having an outer boss and an inner boss defined therein;

a bushing having ends non-rotatably pressed into the inner boss of each of the second track links;

a solid track pin positioned within the bushing and extending through the outer boss of each of the first track links, the track pin being secured to the outer bosses by swaging;

a pair of thrust rings, each of the thrust rings being interposed between one of the ends of the bushing and the outer boss of one the first track links;

grease located between the track pin and the bushing; and a pair of shear seal assemblies, each of the shear seal assemblies being positioned adjacent one of the thrust rings and interposed between one of the ends of the bushing and the outer boss of one of the first track links, each of the shear seal assemblies further preventing the grease from escaping by its respective one of the ends of the bushings.

2. The apparatus of claim 1 further comprising a groove defined on an outer surface of each end of the solid track pin, wherein material from the outer boss of one of the first links is forced into the groove of the solid track pin to swage the outer boss the solid track pin.

3. The track link assembly of claim 1 wherein the track pin is free of axial compression of being secured to the outer bosses by swaging to prevent the first track links from being locked to the second track links.

4. A method of assembling a track link assembly comprising the steps of:

positioning a thrust ring and seal assembly into a cavity adjacent to an outer boss of a first track link;

pressing one end of a bushing into an inner boss of a second track link;

lubricating a track pin;

inserting the track pin through the bushing and outer boss of the first track links;

pre-compressing the track pin;

swaging an end of the track pin to the outer boss of the first track link; and releasing the pre-compression after swaging the end of the track pin to the outer boss of the first track link.

5. The method of claim 4 wherein the step of lubricating the track pin includes placing grease on the track pin prior to inserting the track pin through the bushing and outer boss of the first track link.

\* \* \* \* \*